United States Patent [19]

Kastelein

[11] Patent Number: 5,150,014

[45] Date of Patent: Sep. 22, 1992

[54] LAMP BALLAST CONTROL CIRCUIT AND METHOD

[75] Inventor: Lukas Kastelein, Roosendaal, Netherlands

[73] Assignee: U. S. Philips Corporation, New York, N.Y.

[21] Appl. No.: 639,495

[22] Filed: Jan. 9, 1991

[30] Foreign Application Priority Data

Jan. 29, 1990 [NL] Netherlands .......................... 9000200
Jan. 29, 1990 [NL] Netherlands .......................... 9000202

[51] Int. Cl.$^5$ .......................................... H05B 41/36
[52] U.S. Cl. ................................ 315/224; 315/287; 315/307; 315/DIG. 2; 315/DIG. 7
[58] Field of Search ......... 315/224, 287, 307, DIG. 7, 315/DIG. 2, DIG. 4, 209 R, 244, 289, 208, 308

[56] References Cited

U.S. PATENT DOCUMENTS

| 4,498,031 | 2/1985 | Stupp et al. | 315/307 |
| 4,652,797 | 3/1987 | Nilssen | 315/209 R |
| 4,701,671 | 10/1987 | Stupp et al. | 315/224 |

Primary Examiner—Eugene R. LaRoche
Assistant Examiner—Ali Neyzari
Attorney, Agent, or Firm—Edward Blocker

[57] ABSTRACT

A circuit arrangement and a method suitable for operating a low-pressure mercury discharge lamp which includes circuitry for adjusting the average amplitude of the current provided to the lamp as well as circuitry for adjusting the modulation of the current provided to the lamp.

12 Claims, 2 Drawing Sheets

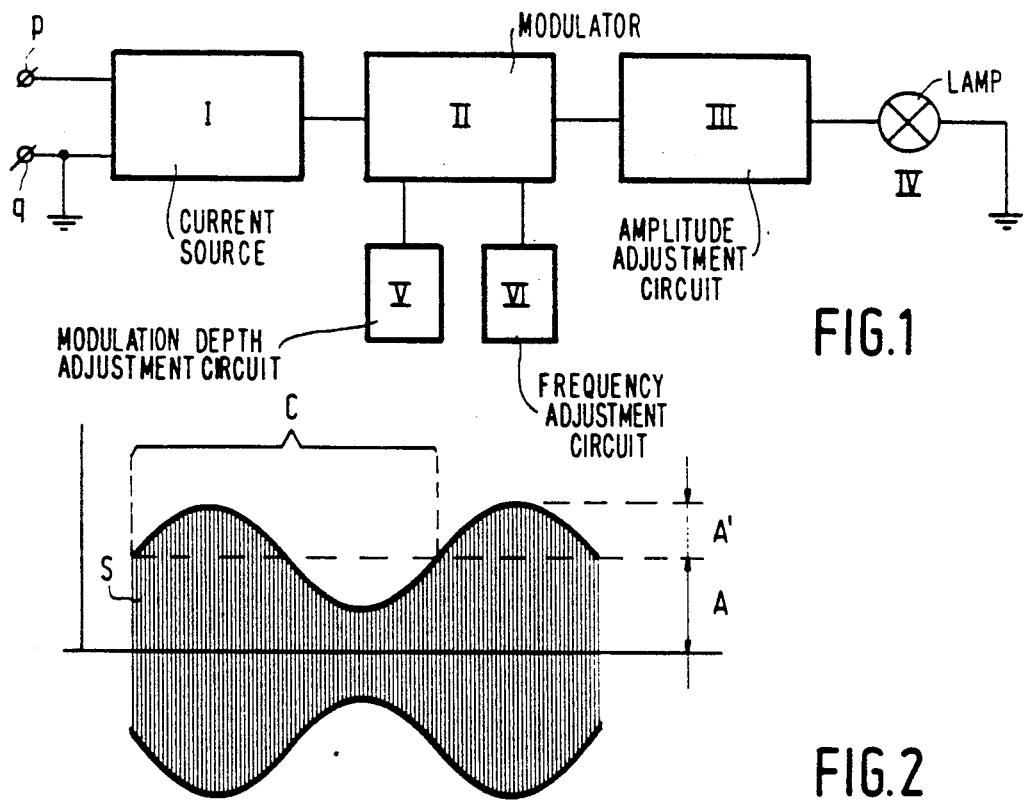
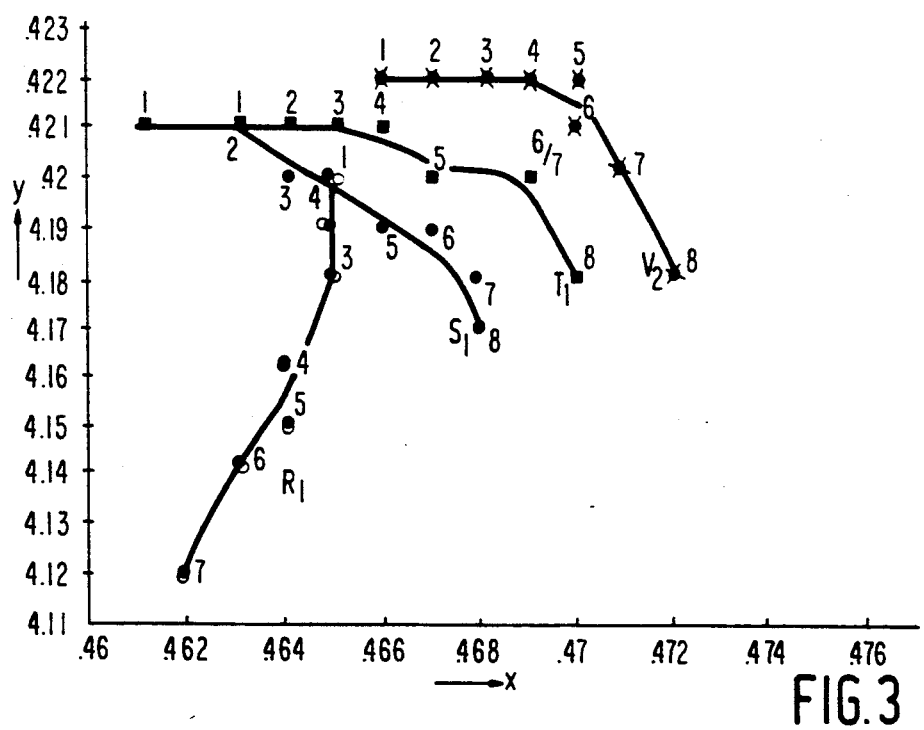

LAMP BALLAST CONTROL CIRCUIT AND METHOD

The invention relates to a circuit arrangement suitable for operating a low-pressure mercury discharge lamp by means of a high-frequency current, comprising
circuitry for generating the high-frequency current from a supply voltage,
a modulator for the substantially sinusoidal amplitude modulation of the high-frequency current with a modulation frequency f and a modulation depth M, and
circuitry for adjusting an amplitude A averaged over a modulation period of the substantially sinusoidal modulated high-frequency current.

A circuit arrangement as described in the opening paragraph is known from the German patent application 2,335,589 laid open for public inspection.

Modulation depth M is understood to mean the ratio of the amplitude A' of the substantially sinusoidal modulation to the amplitude A averaged over a modulation cycle of the high-frequency current.

In the known switching arrangement, the luminous flux of the lamp can be adjusted by adjustment of the amplitude A of the substantially sinusoidal modulated high-frequency current.

Striations are effectively suppressed in the lamp thus operated, also when the luminous flux of the lamp is comparatively small.

A change of the amplitude A, however, does not only change the luminous flux, but also the colour point of the light radiated by the lamp, which is considered to be undesirable in many applications.

The invention has for its object to provide a circuit arrangement with which the colour point of the light radiated by the lamp is to a high degree independent of the luminous flux of the lamp.

According to the invention, a circuit arrangement as described in the opening paragraph is for this purpose characterized in that the circuit arrangement also comprises circuitry for effecting a change in the substantially sinusoidal modulation.

It has been found that the location of the colour point of the light radiated by the lamp is to a high degree independent of the value of the luminous flux of the lamp thanks to the application of a change in the substantially sinusoidal modulation in combination with an adjustment of the amplitude A.

A further advantage of the measure according to the invention is that the colour point of the light radiated by the lamp at a given luminous flux can be adjusted over a wide range through adjustment of the amplitude A and the application of a change in the substantially sinusoidal modulation.

The change in the substantially sinusoidal modulation may consist in a change in the modulation frequency f. It is alternatively possible for the change in the substantially sinusoidal modulation to be a change in the modulation depth M. Either of these changes is easy to implement. If the change in the substantially sinusoidal modulation consists in a change of both the modulation frequency f and the modulation depth M, the range over which the colour point can be adjusted for a chosen luminous flux value is further increased.

The substantially sinusoidal modulated high-frequency current may be either unipolar or bipolar. In the former case it is often necessary to commute the current through the lamp to a low frequency.

A circuit arrangement according to the invention is suitable for operating low-pressure mercury discharge lamps of various types, such as, for example, compact low-pressure mercury discharge lamps, conventional tubular low-pressure mercury discharge lamps, and electrodeless low-pressure mercury discharge lamps.

The invention will be explained in more detail with reference to a drawing of an embodiment.

In the drawing

FIG. 1 shows a diagrammatic representation of the build-up of an embodiment of a circuit arrangement according to the invention and a lamp to be operated with it;

FIG. 2 shows the shape of a lamp current of a lamp operated on a circuit arrangement according to FIG. 1, and FIGS. 3 and 4 show colour points of the lamp operated with the circuit arrangement according to FIG. 1, for various luminous flux values.

Figure 4:
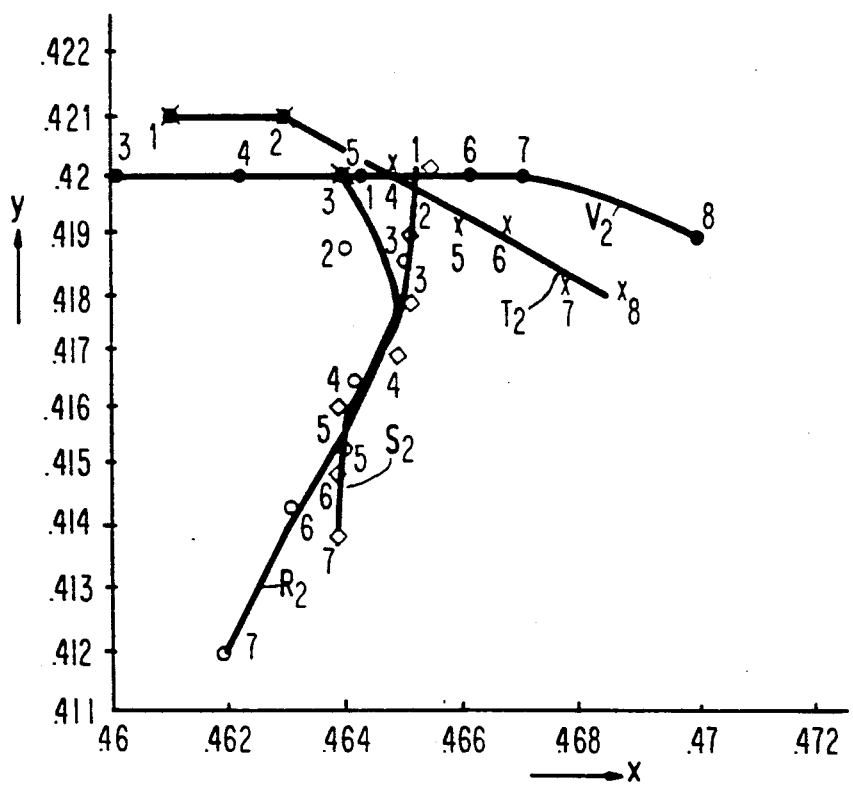

The build-up of the circuit arrangement shown in FIG. 1 according to the invention is as follows.

P and Q are connection terminals suitable for connecting a supply voltage source. I represents a current source which generates a high-frequency current from the supply voltage. An output of the current source I is connected to an input of modulator II, which modulates an amplitude of the high-frequency current into substantially a sinusoidal shape with a modulation frequency f and a modulation depth M. An output of modulator II is connected to an input of circuit arrangement III, with which an amplitude A averaged over a modulation cycle of the substantially sinusoidal modulated current can be adjusted. A low-pressure mercury discharge lamp IV is connected between an output of the circuit arrangement III and an earth terminal.

V and VI are a circuit arrangement for adjusting the modulation depth M and a circuit arrangement for adjusting the modulation frequency f, respectively. An output of the circuit arrangement V for adjusting the modulation depth M is connected to an input of modulator II, while also an output of the circuit arrangement VI for adjusting the modulation frequency f is connected to a further input of modulator II.

The lamp current through the lamp IV as a function of time is shown in FIG. 2.

The time dimension is plotted on a horizontal axis, and a current dimension on a vertical axis. S is a substantially sinusoidal modulated high-frequency current. A is an amplitude average over a modulation cycle of the high-frequency current S. A' is an amplitude of the substantially sinusoidal modulation of the high-frequency current S. The modulation depth M is defined as A'/A. C is a cycle of the substantially sinusoidal modulation. The period C is related to the modulation frequency f in the following way C=1/f.

FIG. 3 shows various colour point settings for various values of the luminous flux and various modulation frequencies f.

Part of the colour triangle is represented in FIG. 3, in which four curves $R_1$, $S_1$, $T_1$ and $V_1$ indicate a shift of a colour point of the lamp, in this case a compact low-pressure mercury lamp, when the luminous flux of the lamp is changed while the modulation frequency remains the same.

The modulation frequencies used were 0, 8, 18 and 36 kHz for the curves $R_1$, $S_1$, $T_1$ and $V_1$, respectively. The luminous flux of the lamp was 600, 540, 480, 420, 360, 300, 240, and 180 lumens in the points 1 to 8 of each curve, respectively. The modulation depth M was 50% and the repetition frequency of the high-frequency current pulses was 50 kHz.

It is evident from the position of the curves in FIG. 3 that the position of the colour point is to a high degree independent of the value of the luminous flux if not only the amplitude A, but also the modulation frequency f of the high-frequency current pulses, with which the lamp is operated, is adjusted when the luminous flux of the lamp is changed.

For example, if the luminous flux of the lamp is reduced from 600 lumens to 420 lumens through adjustment of the amplitude A, starting from the lamp operation represented by point 1 of curve $V_1$ in FIG. 3, the colour point will be shifted to point 4 of curve $V_1$.

If, however, not only the amplitude A is adjusted, but also the modulation frequency f is changed from 36 kHz to 18 kHz, the colour point will be shifted to point 4 of curve $T_1$. It can be seen in FIG. 3 that the latter shift is only one third the shift to point 4 of curve $V_1$ which was found for a constant modulation frequency f.

In addition, the scattered position of points having an identical luminous flux in FIG. 3 illustrates that the colour point of the light radiated by the lamp can be adjusted over a wide range for a chosen luminous flux through adjustment of the modulation frequency f and the amplitude A.

Part of the colour triangle is also represented in FIG. 4, in which four curves $R_2$, $S_2$, $T_2$ and $V_2$ indicate a shift of a colour point of the lamp, in this case a compact low-pressure mercury lamp, when the luminous flux of the lamp is changed while the modulation frequency remains the same.

The modulation depths used were 0, 20, 50 and 100% for the curves $R_2$, $S_2$, $T_2$ and $V_2$, respectively. The luminous flux of the lamp was 600, 540, 480, 420, 360, 300, 240, and 180 lumens in the points 1 to 8 of each curve, respectively. A repetition frequency of the high-frequency current pulses was 50 kHz and the modulation frequency f was 8 kHz.

It is evident from the position of the curves in FIG. 4 that the position of the colour point is to a high degree independent of the value of the luminous flux if not only the amplitude A, but also the modulation frequency M of the substantially sinusoidally modulated high-frequency current, with which the lamp is operated, is adjusted when the luminous flux of the lamp is changed.

For example, if the luminous flux of the lamp is reduced from 600 lumens to 360 lumens through adjustment of the amplitude A at a constant modulation depth, starting from the lamp operation represented by point 1 of curve $R_2$, the colour point will be shifted to point 5 of curve $R_2$, which is a considerable shift.

If, however, not only the amplitude A is adjusted, but also the modulation depth M is changed from 0% to 100%, no measurable shift in the colour point occurs: point 1 of curve $R_2$ coincides with point 5 of curve $V_2$.

In addition, the scattered position of points having an identical luminous flux in FIG. 4 illustrates that the colour point of the light radiated by the lamp can be adjusted over a wide range for a chosen luminous flux through adjustment of the modulation depth M and the amplitude A.

The power rating of the compact low-pressure mercury lamp used was 9 W. The lamp vessel was tubular and had an internal diameter of approximately 10 mm. Argon with a filling pressure of 4 mbar (at 300 K) and a quantity of mercury was introduced in the lamp vessel. A luminescent layer was provided on the wall of the lamp vessel, comprising a mixture of red luminescing yttrium oxide activated by Eu (3+) and green luminescing cerium-magnesium aluminate activated by Tb (3+). The results shown in Table I and Table II were obtained with the same lamp.

Table I shows the shift of the colour point of the lamp for the situation in which, during dimming of the lamp, not only the amplitude A and the modulation frequency f are adjusted, but also the modulation depth M. The effective lamp current is included in Table I as a measure for the amplitude A. It is evident that it is possible in this way to make the colour point of the light radiated by the lamp to a high degree independent of the luminous flux.

Table II illustrates for three different luminous flux values that it is possible to adjust the colour point of the light radiated by the lamp over a wide range, for a given value of the luminous flux, by adjusting the amplitude A, the modulation frequency f, and the modulation depth M. The effective lamp current is indicated as a measure for the amplitude A again in Table II. The repetition frequency of the high-frequency current S was 50 kHz.

TABLE I

| Luminous flux (lm) | Modul. depth (M) (%) | Modul. freq. f (kHz) | Effect. lamp current (mA) | colour point X-coord. | colour point Y-coord. |
| --- | --- | --- | --- | --- | --- |
| 600 | 0 | 0 | 160 | 0.464 | 0.419 |
| 540 | 10 | 12 | 150 | 0.464 | 0.419 |
| 480 | 20 | 12 | 140 | 0.464 | 0.419 |
| 420 | 40 | 6 | 135 | 0.464 | 0.419 |
| 360 | 70 | 4 | 130 | 0.464 | 0.419 |
| 300 | 100 | 3 | 124 | 0.464 | 0.419 |
| 240 | 60 | 3 | 75 | 0.466 | 0.417 |
| 180 | 60 | 3 | 54 | 0.466 | 0.417 |

TABLE II

| Luminous current (lm) | Modul. depth (M) (%) | Modul. freq. f (kHz) | Effect. lamp current (mA) | colour point X-coord. | colour point Y-coord. |
| --- | --- | --- | --- | --- | --- |
| 600 | 50 | 3 | 234 | 0.460 | 0.420 |
| 600 | 50 | 9 | 235 | 0.460 | 0.421 |
| 600 | 10 | 5 | 172 | 0.464 | 0.419 |
| 600 | 50 | 27 | 231 | 0.464 | 0.423 |
| 400 | 90 | 3 | 170 | 0.461 | 0.420 |
| 400 | 10 | 3 | 167 | 0.464 | 0.416 |
| 400 | 100 | 17 | 182 | 0.464 | 0.422 |
| 400 | 100 | 30 | 164 | 0.468 | 0.424 |
| 200 | 10 | 4 | 51 | 0.462 | 0.412 |
| 200 | 100 | 7 | 74 | 0.469 | 0.420 |
| 200 | 100 | 12 | 74 | 0.471 | 0.422 |
| 200 | 100 | 18 | 72 | 0.473 | 0.423 |
| 200 | 100 | 29 | 69 | 0.475 | 0.424 |

I claim:

1. A circuit arrangement suitable for operating a low pressure mercury discharge lamp by means of a high-frequency current, comprising circuitry for generating the high-frequency current from a supply voltage, a modulator for modulating the high-frequency current into a substantially sinusoidally modulated current with a modulation frequency f and a modulation depth M, said current arrangement being provided with circuitry for adjusting an amplitude A averaged over a modulation period of the substantially sinusoidally modulated current and circuitry for effecting a change in the modulation of said substantially sinusoidally modulated current.

2. A circuit arrangement as claimed in claim 1, characterized in that the change in the modulation is a change in the modulation frequency f.

3. A circuit arrangement as claimed in claim 1, characterized in that the change in the modulation is a change in the modulation depth M.

4. A circuit arrangement as claimed in claim 1, characterized in that the change in the modulation is a change in both the modulation depth M and the modulation frequency f.

5. A method for controlling the color point of a low-pressure mercury discharge lamp substantially independent of the luminous flux of the lamp, said method comprising generating a high-frequency current from a supply voltage, modulating the high-frequency current into a substantially sinusoidally modulated current with a modulation frequency f and a modulation depth M, said method including adjusting an amplitude A averaged over a modulation period of the substantially sinusoidally modulated current and effecting a change in the modulation of the substantially sinusoidally modulated current.

6. A method as claimed in claim 5, wherein the change effected in modulation is a change in the modulation frequency f.

7. A method as claimed in claim 5, wherein the change effected in modulation is a change in the modulation depth M.

8. A method as claimed in claim 5, wherein the change effected in modulation is a change in both the modulation depth M and the modulation frequency f.

9. A method for increasing the range through which the color point of a low-pressure mercury discharge lamp can be adjusted, said method comprising generating a high-frequency current from a supply voltage, modulating the high-frequency current into a substantially sinusoidally modulated current with a modulation frequency f and a modulation depth M, said method including adjusting an amplitude A averaged over a modulation period of the substantially sinusoidally modulated current and effecting a change in the modulation of the substantially sinusoidally modulated current appropriately to obtain a selected color point.

10. A method in accordance with claim 9, wherein the change effected in modulation is a change in the modulation frequency f.

11. A method in accordance with claim 9, wherein the change in modulation is a change in the modulation depth M.

12. A method in accordance with claim 9, wherein the change in modulation is a change in both the modulation depth M and the modulation frequency f.

* * * * *